Aug. 22, 1950     H. S. WILLIAMS     2,520,075
HAND-OPERATED FOOD MIXER
Filed March 25, 1948     2 Sheets—Sheet 1
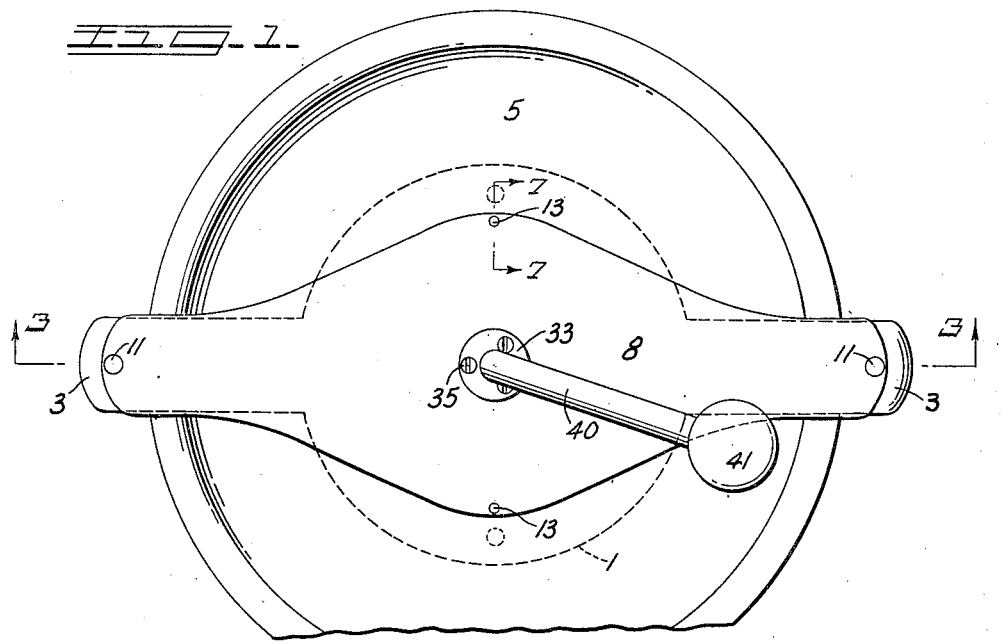
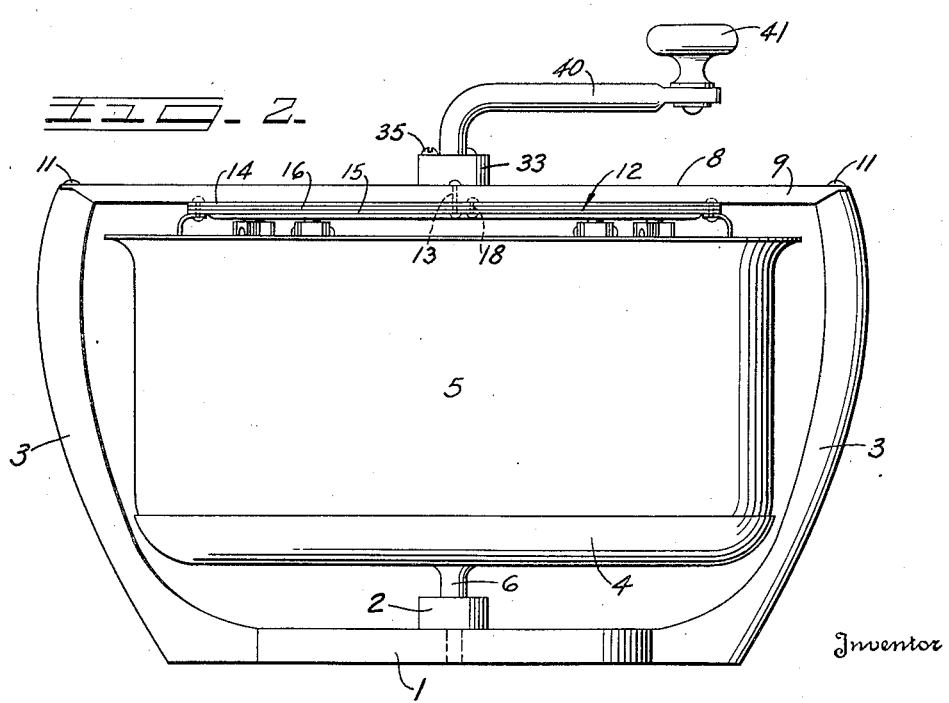
Inventor
Harry S. Williams

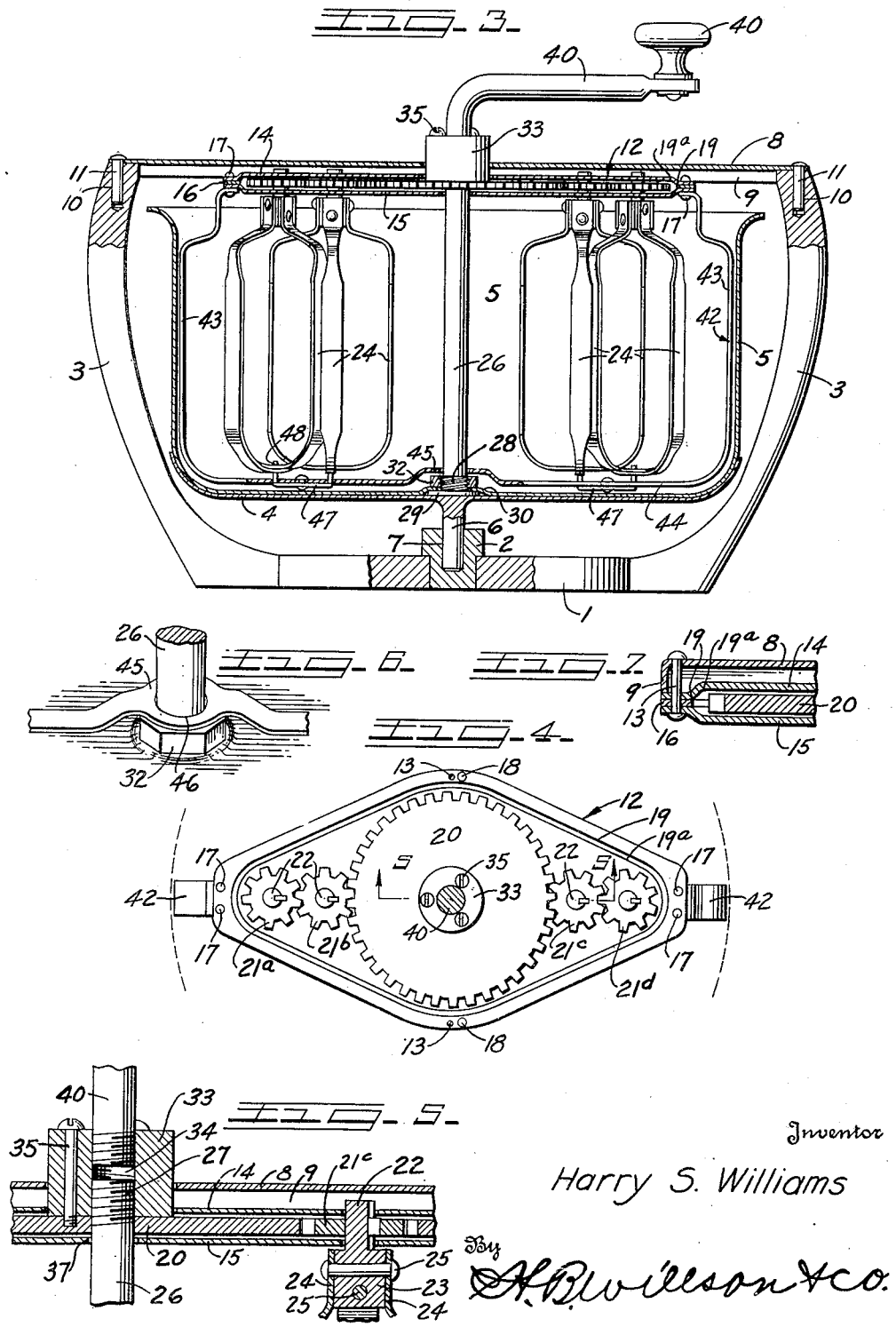

Patented Aug. 22, 1950

2,520,075

UNITED STATES PATENT OFFICE 2,520,075

HAND-OPERATED FOOD MIXER

Harry S. Williams, Wichita, Kans.

Application March 25, 1948, Serial No. 17,055

3 Claims. (Cl. 259—84)

The invention relates to improvements in food mixers that are operated by hand and, in particular, to mixers of the type having a turntable and a bowl associated with it.

One object of the invention is to provide a hand-operated device which may be sold at a low price in competition with the now popular electric mixers.

Another object of the invention is to provide an easily operated hand mixer which will clean or scrape the sides and bottom of the bowl simultaneously with the beating and mixing of the ingredients in the bowl.

A further object of the invention is to provide a mixer which can be economically manufactured and placed on the market at a low cost to the purchaser and at the same time will produce approximately the same results as those obtained by the use of the conventional and more expensive electric mixers.

Still another object is to provide a form of construction whereby the mixer may be operated in either clockwise or a counter-clockwise direction.

Yet another object is to provide multiple sets of beater blades by which the ingredients may be more thoroughly and quickly beaten or mixed.

A still further object is to provide a mixer by which the turntable and bowl will revolve at the same time the beater units are revolved when the crank handle is rotated.

One embodiment of the invention is illustrated in the accompanying drawings in which:

Figure 1 is a top plan view of the food mixer having a part of it broken away.

Fig. 2 is a side elevation.

Fig. 3 is a vertical cross sectional view taken on lines 3—3 of Fig. 1.

Fig. 4 is a plan view of the gear box with the top removed to show the gear arrangement.

Fig. 5 is an enlarged detail sectional view taken on lines 5—5 of Fig. 4.

Fig. 6 is a detail perspective of the central portion of the scraper and associated parts.

Fig. 7 is a detail section on line 7—7 of Fig. 1.

A preferred construction has been illustrated and will be specifically described, with the understanding, however, that within the scope of the invention as claimed; variations may be made.

The improved food mixer comprises a circular base 1 having a centrally disposed bearing 2 attached to and projecting upward from said base. Two opposed and upwardly projecting arms 3 rise from opposite sides of said base and serve as a support for the operative parts of the device.

A conventional turntable 4 is provided to rotatably support a mixing bowl 5. A centrally disposed pivot 6 projects downward from the bottom of said turntable and is received by a bore or socket 7 in said bearing 2. Thus, when the turntable and bowl are revolved the pivot 6 supports the turntable and revolves in the bearing 2. The turntable is provided with an upwardly turned flange which may correspond to the contour or shape of the bottom of the bowl to center it on the turntable.

A frame or cross member 8 rests on the upper ends of said arms 3 and has flanges 9 on each side of rest against the sides of arms or supports 3. Bores or sockets 10 are provided to removably receive pins 11 riveted or similarly fixed to the ends of said frame 8. By the use of said flanges 8 and said pins 11 it can be seen that said frame 8 will be held in a rigid position on said arms 3 until removed or lifted off of the arms.

Frame 8 and its side flanges 9 are preferably made of a sheet of metal of the proper gage. It is relatively narrow at the ends and wide at its center as shown in Fig. 1. It is to be noted that the central portion of the frame generally has the same shape as the gear box to be hereinafter described.

A gear box or casing 12 is fastened to the under side of said frame 8 by means of rivets 13 or the like as shown in Fig. 1 with said flanges 9 resting on the top of the said gear box opposite the said rivets 13 thus forming a space or pocket between said frame and said gear box of the height of said flanges 9. The gear box comprises a top plate 14, a bottom plate 15 and an intermediate spacer plate 16. These plates are preferably made of sheet metal and are fastened together by means of said rivets 17 and 18 or the like as shown in Fig. 4. Said top and bottom plates 14 and 15 are expanded or bulged outwardly at 19 and 19a of Figs. 3 and 7 to allow greater space for the gears in the box. The inner edge of said spacer plate 16 is indicated also by line 19 in Fig. 4.

A large gear 20 is centrally and horizontally disposed inside of said gear box and four relatively smaller gears 21ª, 21ᵇ, 21ᶜ, and 21ᵈ are also disposed horizontally within said box. All of said gears being in alignment and intermeshed with each other as seen in Fig. 4.

A shaft 22 is keyed or similarly fastened to each of said four small gears, said shafts passing through and being rotatable in openings in the top and bottom plates 14 and 15 of said gear box. A block 23 is fixed to the lower end of each of said shafts 22 to serve as a support for beater blades. Four beater blades 24 are attached to each of said blocks and are formed from two strips of sheet metal or the like, each strip being bent and returned upon itself to form two oppositely disposed blades 24. Said ends of said strips being fastened to said blocks by means of rivets or the like 25. It is to be noted that the arrangement of the sets of blades on each of the two blocks on either side of the large gear is such that the blades intermesh with each other but do not come in contact as the blocks and blades revolve, the association of the blades being similar to those of the commonly used egg-beater.

A centrally disposed, vertical post 26 is fixed in the center of the bottom of the bowl. The post has a screw-threaded top 27 and its lower end has an enlarged screw-threaded portion 28 above an integral head or disk 29. The bottom of said bowl 5 has a central opening surrounded by a raised portion 30 to form a seat for the disk 29 when the post is inserted. A nut 32 is screwed onto said threads 28 and against the raised portion 30 to securely anchor the post of the bowl.

A hub 33 is provided and has a centrally disposed bore 34. Said hub 33 rests on top of and is fastened to said large gear 20 by means of screws 35 as shown in Figs. 4 and 5. The upper end of said post 26 passes through and is rotatable within an opening 27 in the bottom of said gear box and also passes through an opening in said large gear 20, being screwed into bore 34 in said hub. Openings are provided in said frame or cross bar 6 and in the top 14 of said gear box so that the upper part of hub 33 projects freely through and above said frame, as shown in Figs. 3 and 5.

A conventional crank 40 having a rotatable knob 41 is screwed into bore 34 and is thus attached to the large gear.

A scraper 42 is provided to scrape the material being mixed from the bottom and sides of the bowl as the latter rotates. It is preferably constructed of sheet metal and is substantially U-shaped. Its inwardly offset ends are attached to the ends of said gear box by means of the fastenings 17. The scraper has two vertical scraper blades 43 which move in close proximity with the inner side wall of the bowl, and a horizontal bottom scraper blade 44 to move in close proximity with the bottom of the bowl. The bottom scraper has a raised and centrally disposed portion 45 to keep said scraper free of said nut 32 and an opening 46 is provided in said raised portion 45 through which post 26 freely passes as shown in Fig. 6.

The lower ends of said beater blades 24 are rotatably mounted on the said scraper blade 44 by means of U-shaped bearings 47, one being used to fasten each of the two sets of coacting blades. Said bearings are riveted or similarly fastened to the lower face of said scraper bottom 44 and each has two pivot pins 48 on its ends projecting upward through openings in said scraper and in the lower ends of said beater blades, as shown in Fig. 3, said beater blades being thus rotatably held at their lower ends.

It will be noted that the weight of the bowl and its contents to be mixed are supported on the freely rotatable turntable and that the crank handle is positively connected to the fixed post in the bowl as well as to the large gear 20. Hence, when the hand crank is turned in either direction the bowl will revolve about the axis of the post and the two sets of beaters will be rotated while the scraper will be held stationary because of its connection to the gear box which in turn is fixed to the cross bar or frame mounted on the arms or posts 3. The entire contents of the bowl will therefore be thoroughly beaten while being stirred and mixed since the scraper will tend to throw the portion of the contents of the bowl adjacent to its side wall and bottom inwardly toward the two beater units.

While the preferred embodiment of the invention has been shown and described in detail, it will be understood that variations may be made within the scope of the following claims:

What is claimed is:

1. A mixer comprising a base having upstanding arms formed with sockets in their upper ends, a cross bar extending between said arms and formed with depending side flanges, pins extending downwardly from ends of said cross bar, said cross bar having its ends resting upon the upper ends of said arms with its pins fitting into the sockets, and the ends of its side flanges engaging opposite sides of the arms to prevent movement of the cross bar transversely of the arms, a gear box disposed under said cross bar and between the side flanges thereof, a main gear and secondary gears in said box meshing with each other, a bowl disposed over said base and between the arms thereof and rotatably supported, a post mounted vertically through said bowl centrally thereof and having its lower end attached to the bowl and its upper end passing through the box and the main gear, a hand crank connected with the upper end of said post, said main gear turning with the post and its crank, a scraper in said bowl secured to the gear box, and beaters extending downwardly from the box within the bowl and having shafts at their upper ends rotatably mounted through the box and carrying the secondary gears.

2. A mixer comprising a base having upstanding arms formed with sockets in their upper ends, a cross bar extending between said arms and formed with depending side flanges, pins extending downwardly from ends of said cross bar, said cross bar having its ends resting upon the upper ends of said arms with its pins fitting into the sockets, and the ends of its side flanges engaging opposite sides of the arms to prevent movement of the cross bar transversely of the arms, a gear box disposed under said cross bar and between the side flanges thereof, a bowl rotatably mounted upon said base, a post attached to the bottom of said bowl having its upper end portion rotatably mounted through the cross bar and provided with a turning member, rotary beaters extending downwardly from the gear box into said bowl, and gears in said box for transmitting rotary movement from the post to said beaters.

3. A mixer comprising a base having upstanding arms, a cross bar removably mounted between the arms, a bearing at the center of said base, a bowl disposed between said arms and having a centrally positioned socket in its bottom, a pivot supporting said bowl and extending downwardly at its center and rotatably mounted in said bearing, a gear box under said cross bar, a main gear and secondary gears in said box, a vertical post in said bowl having its lower end detachably mounted in said socket, a hub rising from the main gear and formed with a threaded bore into which the upper end of the post is screwed, a crank handle having its inner end screwed into the bore of the hub above the upper end of said post, a scraper in said bowl fitting loosely about the lower portion of the post and having upstanding arms secured to the gear box, and beaters disposed vertically in the bowl and having shafts at their upper ends entering the box and carrying the secondary gears.

HARRY S. WILLIAMS.

REFERENCES CITED

The following references are of record in the file of this patent:

UNITED STATES PATENTS

| Number | Name | Date |
|---|---|---|
| 469,456 | Shepard et al. | Feb. 23, 1892 |
| 562,952 | Durand | June 30, 1896 |
| 760,388 | Durand | May 17, 1904 |
| 901,465 | Pancoast | Oct. 20, 1908 |
| 1,430,704 | Wadsworth | Oct. 3, 1922 |